United States Patent
Olsen et al.

(10) Patent No.: US 10,277,479 B2
(45) Date of Patent: Apr. 30, 2019

(54) METHOD AND APPARATUS FOR DETERMINING USER CONTEXT

(75) Inventors: Jesper Olsen, Beijing (CN); Happia Cao, Beijing (CN); Jilei Tian, Beijing (CN)

(73) Assignee: Nokia Technologies Oy, Espoo (FI)

( * ) Notice: Subject to any disclaimer, the term of this patent is extended or adjusted under 35 U.S.C. 154(b) by 150 days.

(21) Appl. No.: 13/696,930

(22) PCT Filed: May 11, 2010

(86) PCT No.: PCT/CN2010/072604
§ 371 (c)(1),
(2), (4) Date: Feb. 4, 2013

(87) PCT Pub. No.: WO2011/140701
PCT Pub. Date: Nov. 17, 2011

(65) Prior Publication Data
US 2013/0132566 A1    May 23, 2013

(51) Int. Cl.
G06F 13/00 (2006.01)
H04L 12/26 (2006.01)
H04W 4/02 (2018.01)
H04L 29/08 (2006.01)

(52) U.S. Cl.
CPC ........... *H04L 43/00* (2013.01); *H04L 67/306* (2013.01); *H04W 4/025* (2013.01)

(58) Field of Classification Search
CPC . G10L 15/183; G06F 17/30528; H04L 67/22; H04L 67/306; H04L 67/30; H04L 43/00; H04W 4/025
USPC ................. 709/224, 223, 226, 229
See application file for complete search history.

(56) References Cited

U.S. PATENT DOCUMENTS

| | | | |
|---|---|---|---|
| 6,199,099 B1* | 3/2001 | Gershman et al. | 709/203 |
| 8,108,398 B2* | 1/2012 | Guday | G06F 17/30719 704/10 |
| 8,200,953 B1* | 6/2012 | Parsons | G06F 21/57 713/1 |
| 2004/0259536 A1 | 12/2004 | Keskar et al. | |
| 2006/0208085 A1 | 9/2006 | Cohen et al. | |
| 2007/0299631 A1* | 12/2007 | Macbeth et al. | 702/187 |

(Continued)

FOREIGN PATENT DOCUMENTS

| | | |
|---|---|---|
| CN | 1882947 A | 12/2006 |
| CN | 101287040 A | 10/2008 |

(Continued)

OTHER PUBLICATIONS

International Search Report received for corresponding Patent Cooperation Treaty Application No. PCT/CN2010/072604, dated Feb. 17, 2011, 3 pages.

(Continued)

*Primary Examiner* — Kenneth R Coulter
(74) *Attorney, Agent, or Firm* — Ditthavong & Steiner, P.C.

(57) ABSTRACT

An approach is provided for training a device to associate user, object or device context information with a user defined context. The context information platform receives recorded context information from a device. The associated recorded context information is then associated with the context to enable training of a context model associated with the context.

18 Claims, 12 Drawing Sheets

(56) References Cited

U.S. PATENT DOCUMENTS

| | | | |
|---|---|---|---|
| 2007/0299712 A1 | 12/2007 | Macbeth et al. | |
| 2007/0299713 A1* | 12/2007 | Macbeth et al. | 705/9 |
| 2008/0005068 A1 | 1/2008 | Dumais et al. | |
| 2009/0006369 A1* | 1/2009 | Guday | G06F 17/30719 |
| 2009/0319456 A1 | 12/2009 | Consul et al. | |
| 2010/0048167 A1 | 2/2010 | Chow et al. | |
| 2012/0046068 A1* | 2/2012 | Katpelly et al. | 455/550.1 |

FOREIGN PATENT DOCUMENTS

| | | |
|---|---|---|
| CN | 101437445 A | 5/2009 |
| EP | 1151372 B1 | 11/2001 |
| WO | 2000/036493 A1 | 6/2000 |
| WO | 03/043356 A1 | 5/2003 |
| WO | 2009/114301 A2 | 9/2009 |
| WO | 2009133233 A1 | 11/2009 |

OTHER PUBLICATIONS

Written Opinion of the International Search Report received for corresponding Patent Cooperation Treaty Application No. PCT/CN2010/072604, dated Feb. 17, 2011, 6 pages.

International Preliminary Report on Patentability for corresponding Patent Cooperation Treaty Application No. PCT/CN2010/072604, dated Nov. 13, 2012, 7 pages.

Office Action for corresponding European Patent Application No. 10851208.8-1870, dated Mar. 30, 2017, 10 pages.

Dey et al., "A CAPpella: Programming by Demonstration of Context-Aware Applications", CHI 2004, Proceedings of the SIGCHI Conference on Human Factors in Computing Systems, vol. 6, No. 1, Apr. 24-29, pp. 33-40.

Santos et al., "Mobile Context Provider for Social Networking", Proceedings of the Confederated International Workshops and Posters on On the Move to Meaningful Internet Systems: ADI, CAMS, E12N, ISDE, IWSSA, MONET, OnToContent, ODIS, ORM, OTM Academy, SWWS, SEMELS, Beyond SAWSDL, and COMBEK 2009 vol. 5872, 11 pages.

Ravi et al., "Activity Recognition From Accelerometer Data", In Proceedings of the Seventeenth Conference on Innovative Applications of Artificial Intelligence, 2005, pp. 1541-1546.

Chapelle et al., "Optimization Techniques for Semi-Supervised Support Vector Machines", Journal of Machine Learning Research, vol. 9, 2008, pp. 203-233.

Lu et al., "Opinion Integration Through Semi-Supervised Topic Modeling Export", Proceedings of the 17th international conference on World Wide Web, Apr. 21-25, 2008, pp. 121-130.

Korpipaa et al., "Customizing User Interaction in Smart Phones", IEEE Pervasive Computing, vol. 5, Issue: 3, Jul.-Sep. 2006, pp. 82-90.

Riekki et al., "Enabling Context-Aware Services for Mobile Users", Proceedings of IADIS Distributed and Parallel Systems and Architectures conference as part of IADIS Virtual Multi Conference on Computer Science and Information Systems, Apr. 11-29, 2005, 10 pages.

Office action received for corresponding Chinese Patent Application No. 201080066685.X, dated Nov. 3, 2014, 11 pages of office action and No English Language Translation available.

Hakkila et al., "Interaction and End-User Programming With a Context-Aware Mobile Application", Human-Computer Interaction—INTERACT, Lecture Notes in Computer Science, vol. 3585, 2005, pp. 927-937.

Chinese Office Action for related Chinese Patent Application No. 201080066685.X dated Jul. 13, 2015, with English-language summary, 10 Pages.

Office Action for corresponding Chinese Patent Application No. 201080066685.X, dated Jan. 13, 2016, with English-language summary, 4 Pages.

Office Action for corresponding European Patent Application No. 10 851 208.8-1218, dated Feb. 18, 2019, 5 pages.

\* cited by examiner

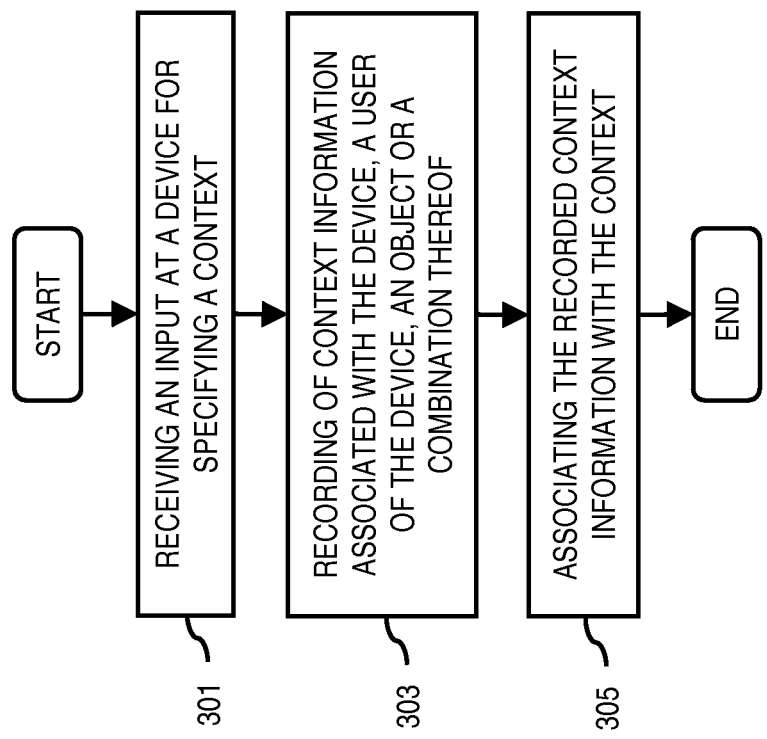

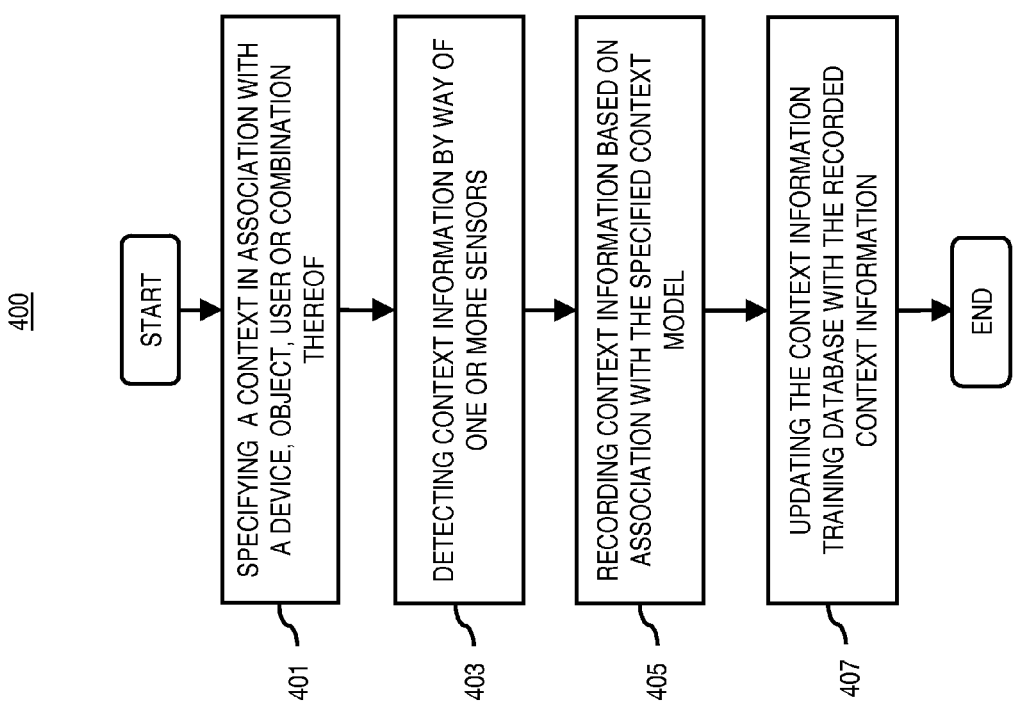

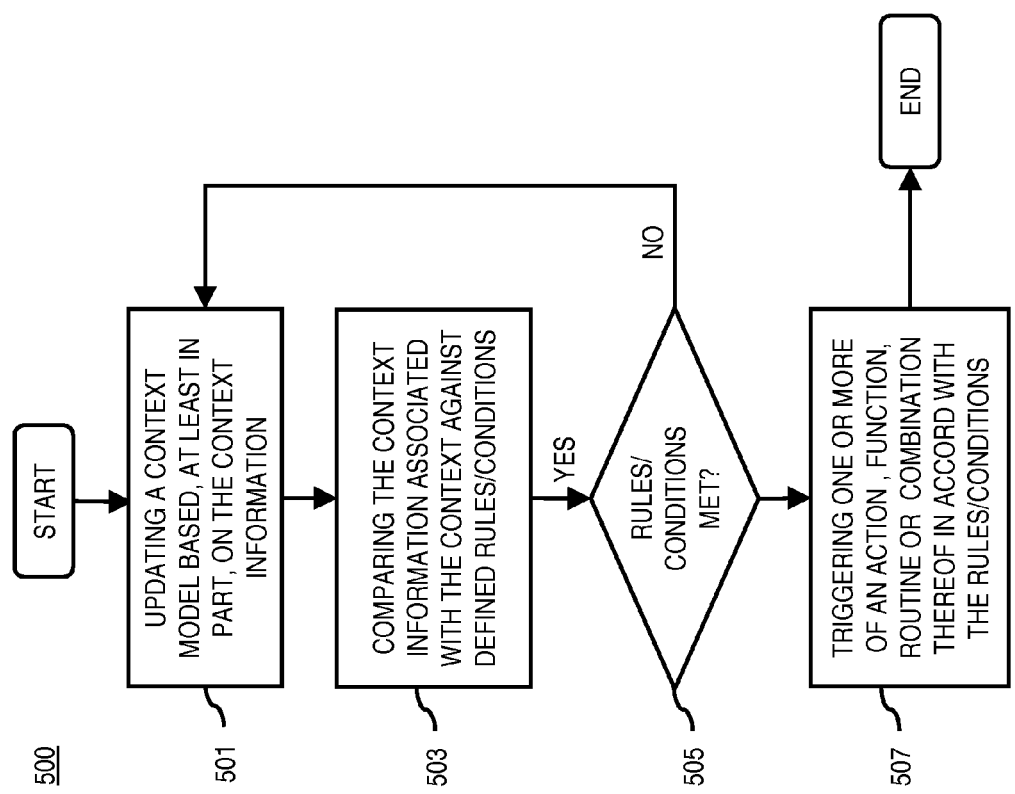

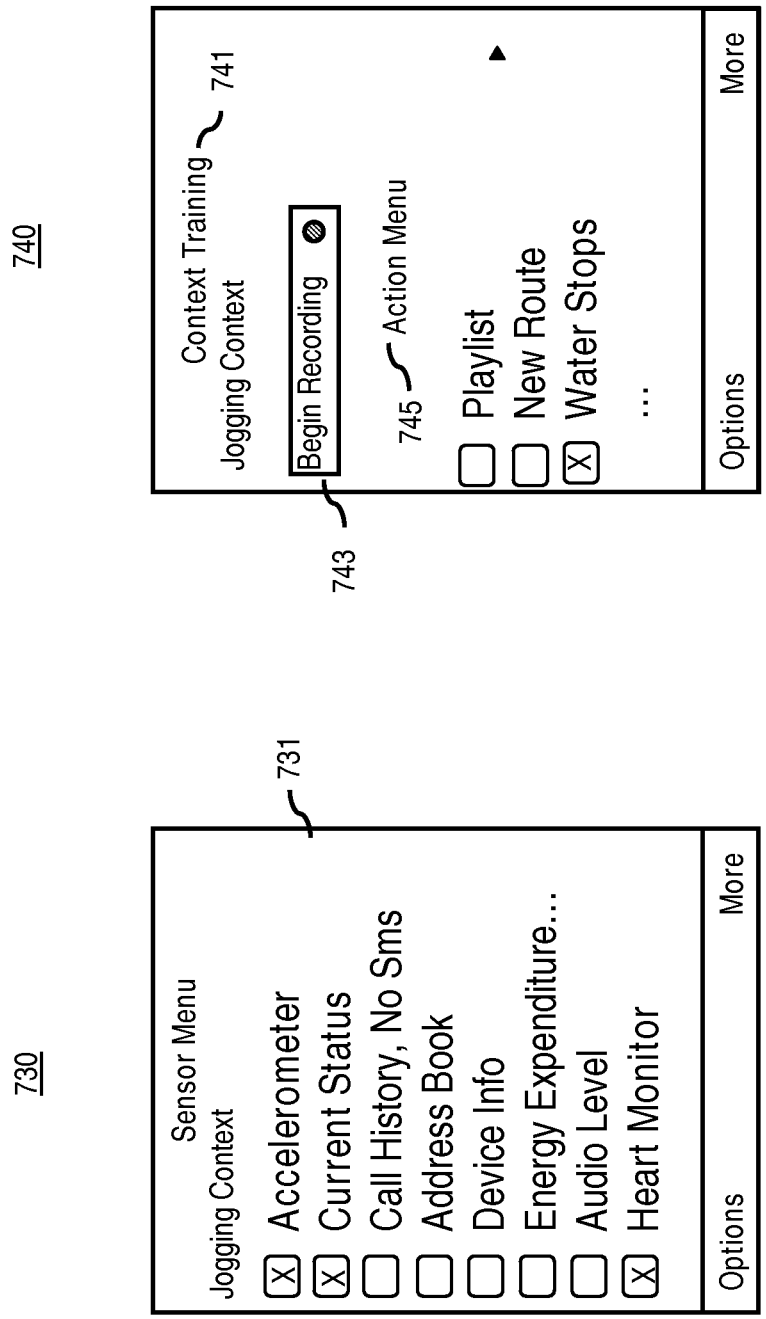

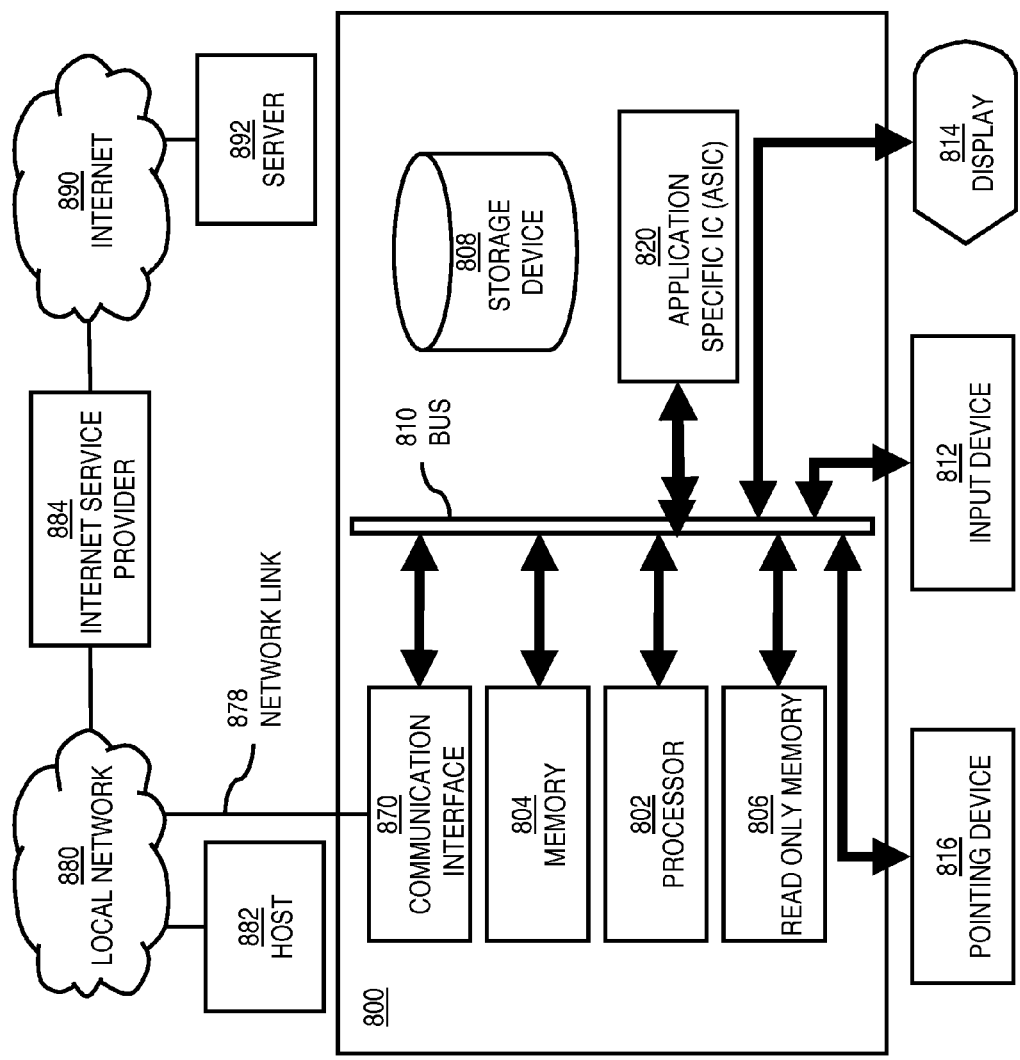

METHOD AND APPARATUS FOR DETERMINING USER CONTEXT

RELATED APPLICATION

This application was originally filed as PCT Application No. PCT/CN2010/072604 filed May 11, 2010.

BACKGROUND

Service providers (e.g., wireless and cellular services) and device manufacturers are continually challenged to deliver value and convenience to consumers by, for example, providing compelling network services and advancing the underlying technologies. One area of interest has been the development of services and technologies for characterizing user behavior with respect to the user's interactions with a device (e.g., a cell phone, smartphone, or other mobile device). More specifically, characterizing user behavior relies, for instance, on correlating user interactions with the device (e.g., user engaging various functions and features of the device to place a phone call, invoke an application, play a media file, snap a picture, etc.) with a given context associated with the user or device (e.g., a location, time, date, activity, etc.). However, service providers and device manufacturers face significant technical challenges in making such a correlation because of the difficulties of characterizing more complex user contexts. As a result, the ability to automate certain user interactions with the mobile device in the instance of a given context is limited. For example, if a user desires to have their mobile device automatically log mileage and route data amassed as they jog via usage of a software application, the mobile device must be properly trained to detect and perceive context information (e.g., mileage and route data) pertaining to this type of software interaction (e.g., mileage logging) in correlation with the correct moment/context (at the onset of or during the time of jogging).

SOME EXAMPLE EMBODIMENTS

Therefore, there is a need for an approach for training a device to associate user, object or device context information with a user defined context.

According to one embodiment, a method comprises receiving an input at a device for specifying a context. The method also comprises causing, at least in part, recording of context information associated with the device, a user of the device, or a combination thereof. The method further comprises associating the recorded context information with the context.

According to another embodiment, an apparatus comprising at least one processor, and at least one memory including computer program code, the at least one memory and the computer program code configured to, with the at least one processor, cause, at least in part, the apparatus to receive an input at a device for specifying a context. The apparatus is also caused to record context information associated with the device, a user of the device, or a combination thereof. The apparatus is further caused to associate the recorded context information with the context.

According to another embodiment, a computer-readable storage medium carrying one or more sequences of one or more instructions which, when executed by one or more processors, cause, at least in part, an apparatus to receive an input at a device for specifying a context. The apparatus is also caused to record context information associated with the device, a user of the device, or a combination thereof. The apparatus is further caused to associate the recorded context information with the context.

According to another embodiment, an apparatus comprises means for receiving an input at a device for specifying a context. The apparatus also comprises means for causing, at least in part, recording of context information associated with the device, a user of the device, or a combination thereof. The apparatus further comprises means for associating the recorded context information with the context.

According to another embodiment, a method comprises facilitating access to at least one interface configured to allow access to at least one service, the at least one service configured to cause, at least in part, receiving an input at a device for specifying a context. The service is also configured to cause, at least in part, recording of context information associated with the device, a user of the device, or a combination thereof. The service is further configured to cause, at least in part, associating the recorded context information with the context.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a high-level flowchart of a process for associating user, object or device context information with a user defined context model representative of a real-world context, according to one embodiment;

FIG. 4A is a flowchart of a process for associating context information with a user defined context model representative of a real-world context, according to one embodiment;

FIG. 5 is a flowchart of a process for triggering one or more actions based on recorded context information or monitored unlabeled context information for a specified user context, according to one embodiment;

FIGS. 7A-7D are diagrams of user interfaces of a device utilized in the processes of FIGS. 4A, 4B and 5, according to various embodiments;

FIG. 8 is a diagram of hardware that can be used to implement an embodiment of the invention;

DESCRIPTION OF SOME EMBODIMENTS

Examples of a method, apparatus, and computer program for training a device to associate user, object or device context information with a user defined context are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to a mobile device, it is contemplated that the approach described herein may be used with any other device that supports and maintains the detection of context data in association with a user defined context.

Figure 1:
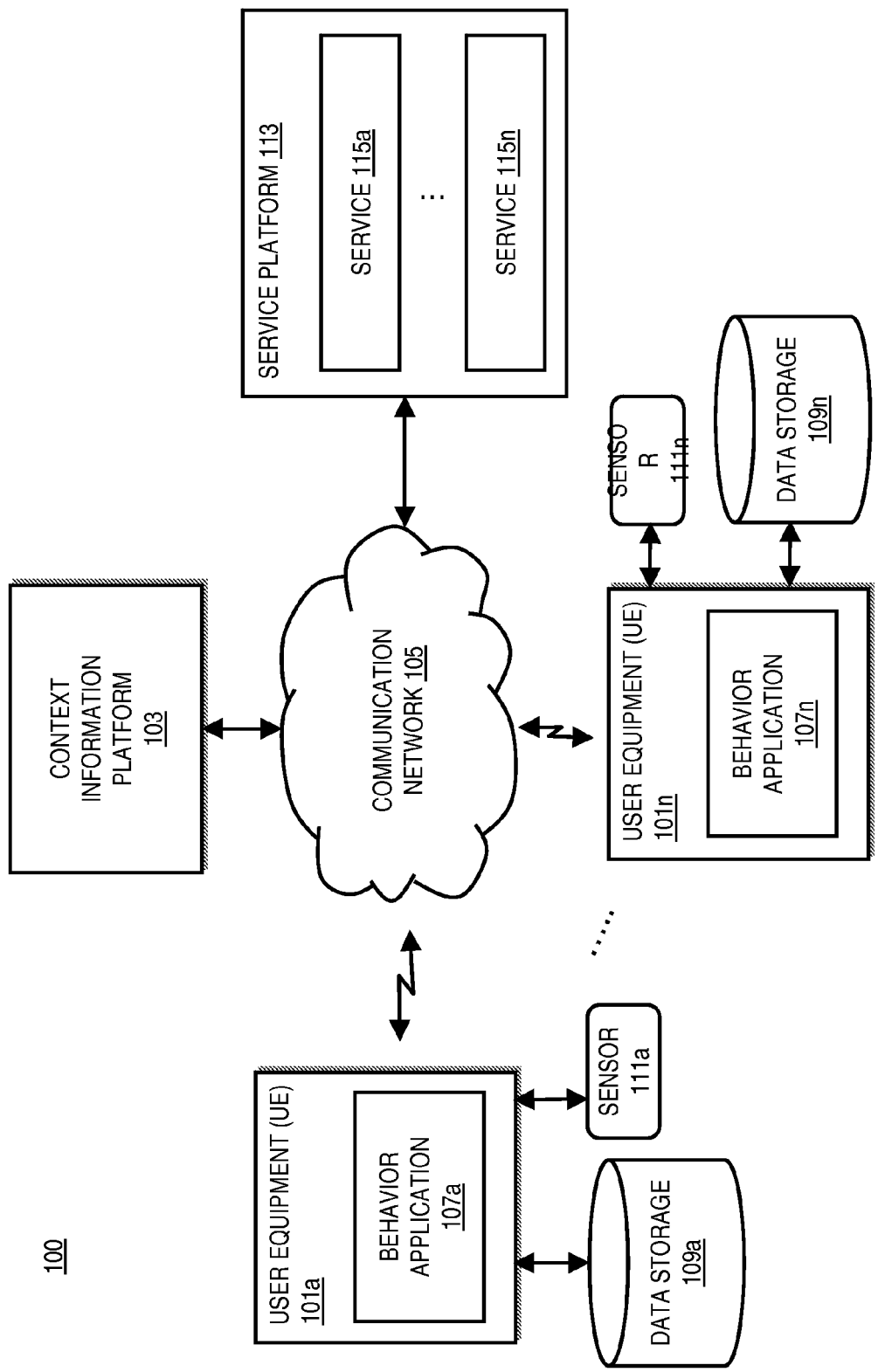
FIG. 1 is a diagram of a system for associating user, object or device context information with a user defined context model representative of a real-world context, according to one embodiment.

FIG. 1 is a diagram of a system for associating user, object or device context information with a user defined context model representative of a real-world context, according to one embodiment. "User interaction," as referenced herein, pertains to any means in which the device user engages various functions and features of the device, such as to fulfill a desired mode of usage and/or in connection with a given operational environment. As discussed previously, it is noted that how, what, when and where a person (the who) uses a device (e.g., a mobile device) can be examined to show specific patterns that represent user behaviors or functional device usage tendencies relative to a given context (i.e., information revealing of why it was engaged in such a way). By way of example, some mobile devices keep records of the user's interaction, both functional and informational, with the device, such as: (1) a log/history of user communications performed by the device by way of a text messaging application or e-mail; (2) a "most recently" user selected play list associated with a media player of the device; (3) a "recently played" games list associated with various gaming applications; (4) a log of user employed device applications; etc. This user interaction history or data may be recorded with respect to context data associated with the device (e.g., time, location, environmental condition, etc.). Moreover, data may be recorded at the moment of the interaction and stored as context information.

In general, "context information" refers to, at least in part, all context data and interaction data (e.g., date, time of day, location, activity, motion, position, modality, spatiotemporal element, etc.) collected during an instance of device use relative to an object or user. This may include data transmitted to the device during an instance of context engagement by one or more services 115a-115n, including but not limited to RSS feed data, weather data, location data, user profile information, etc. Also, context information pertains to any data gathered by one or more sensors 111a of the device in association with a defined context of device usage, said data representing sensory phenomena useful for characterizing the present moment interaction between the device and one or more devices, objects or users. Objects for which the device may interact may include, but is not limited to, other user devices (e.g., cell phones), peripheral devices such as Bluetooth headsets, keyboards and server devices or entities within the immediate environment or context of use such as buildings, landmarks, machines, vehicles or people.

In general, context information can be defined as a data type conforming to one or more contexts, wherein each context is defined according to a context model. For example, given context information received as data types including a time, context data, and interaction data, e.g., [time=t1, Context Data=<(Work Day), (Evening), (High Speed), (High Audio Level)>, Interaction=Play Games], various combinations or permutations of the context data can yield various contexts such as: (1) <(Evening)>, (2) <High Speed>, (3) <(Work Day), (Evening)>, etc. It is contemplated that context information can be any subset of data types arranged in any combination, defined in accord with a context model.

It is noted that because the context involving the mobile device is often closely associated with specific usage intent, associations between specific contexts and the user interactions with the device may characterize the user's behavior patterns. This characterization is defined according to the context model. As used herein, a "context model" pertains to any data type definitions, associated data structures and/or schema for representing an object, interaction, event, process or combination thereof. In particular, the context model indicates the classifier types and object types, associated expected input data types and the expected response or output data types for the context being modeled (e.g., a system or object based context). Furthermore, the context model indicates the relationships between the data sets and data types of which it is comprised. Still further, the context model may also define one or more object-oriented, abstract or conceptual elements that in combination, characterize the behavior of an underlying system, object, interaction, event or process. It will be recognized that the various known approaches to generation of a context model are within the scope of the embodiments as presented. As a general approach, the context model can be designed initially to pattern known or historical interactions respective to a device, object or user.

Recognizing the context information pertaining to a given context model can enable automation of various interactions between the mobile device and the user, event or object associated with the context. For example, given a perceived real-world context that the user is waiting for a bus in the evening of a work day and the environment is noisy, the expected (typical) behavior pattern (e.g., derived from the user's previously recorded interaction history) is that the user plays a game with a maximum sound level by way of a gaming application resident on or accessible by the device. Consequently, the context model for this context and interactivity is designed with inputs and outputs corresponding to this scenario. In another example, given a context that the user is taking a bus in the morning of a work day, the expected behavior pattern is that the user listens to rock music by way of a media player application on or accessible by the device. Again, the context model for this context and interactivity is designed with inputs and outputs corresponding to this scenario. In yet another example, given a context that the user is walking in a park in the afternoon of a holiday, the expected behavior pattern is that the user captures images by way of a image capturing application resident on or accessible by the device. As before, the context model characterizing this interaction and context is based in part on historical or expected data and patterns.

Hence, objectively expected (typical or historical) behavior data can be used to generate an initial context model that is representative of a unique context in question. In this way, if it is desired by the user to automatically invoke device actions (e.g., play music) in response to differing contextual occurrences, the device can act based on present moment context information as well as the initially defined context model. Of course, the ability for the device to take action is only as good as its ability to properly associate perceived context information with the appropriate context model. Given the intricacies of data types definable as context information, the occurrence of undefined data types being perceived in association with a given defined context (e.g., undefined sound data or motion data being detected) and the complexity of accounting for differing contexts, properly configuring or training the device to respond accurately is a daunting task.

To address this problem, system 100 of FIG. 1 enables a device to respond to context information gathered respective to a user, object or device, whether the context information is labeled (known or expected data type) or unlabeled (unknown or unexpected data type), in association with a user defined context. The system 100 comprises a user equipment (UE) 101 having connectivity to a context information platform 103 via a communication network 105. In the example of FIG. 1, the context information platform 103 collects context information as recorded or monitored by the UE 101 in association with a user defined context. The platform 103 also analyzes the context information to perform one or more of the following: 1) determine if a particular set of monitored unlabeled context information is associated with a specified context model; 2) record context information correlating to a specified context model; 3) maintain context data for use in further training/refining a context model associated with a given context.

In certain embodiments, the UE 101 may include a behavior application 107 for interacting with the context information platform 103 to perform one or more functions of the context information platform 103. For example, the behavior application 107 can monitor or record context information for use by the context information platform 103. More specifically, the behavior application 107 can interact with and control one or more sensors 111, wherein the control is facilitated with respect to a particular user defined context model. So, for example, in generating the context model intended to represent or characterize a particular context, one or more sensors may be specified to provide input data corresponding to defined input data types. Exemplary sensors 111 may include, but is not limited to, a sound recorder, light sensor, global positioning system (GPS) device, temperature sensor, motion sensor, accelerometer, gyroscope and/or any other device for perceiving sensory phenomena. The sensors 111 may also include an internal antenna through which wireless communication signal data may be detected. Upon receipt or detection, the UE 101 can then store the collected data in, for instance, the data storage 109, conforming to a data structure with specified data types defined by the context model.

In one embodiment, the behavior application 107 and the context information platform 103 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

In another embodiment, the behavior application 107 can operate independently of or without the presence of the context information platform 103. In this way, the behavior application 107 can perform all of the functions of the context information platform 103 without transmitting any context information to the platform 103, thereby decreasing any potential exposure of the context data and interaction data to external entities. Accordingly, although various embodiments are described with respect to the context information platform 103, it is contemplated that the functions of the platform 103 can also be performed by the behavior application 107 or similar component of the system 100. In the example of the functions of the platform being performed by the behavior application 107, sensory input (context information) as detected by one or more sensors 111a-11-n, need not be externally transmitted.

In one embodiment, the context information platform 103 and/or the behavior application 107 have connectivity to context information available from, for instance, the service platform 113 which includes one or more services 115a-115n (e.g., weather service, location service, mapping service, media service, etc.). By way of example, these services 115 can provide additional information on environmental conditions (e.g., weather), activities (e.g., playing online games), preferences (e.g., musical preferences), location (e.g., location tracking service), etc. that can provide related context information associated with the UE 101 or the user of the UE 101.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, the context information platform 103 and the service platform 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
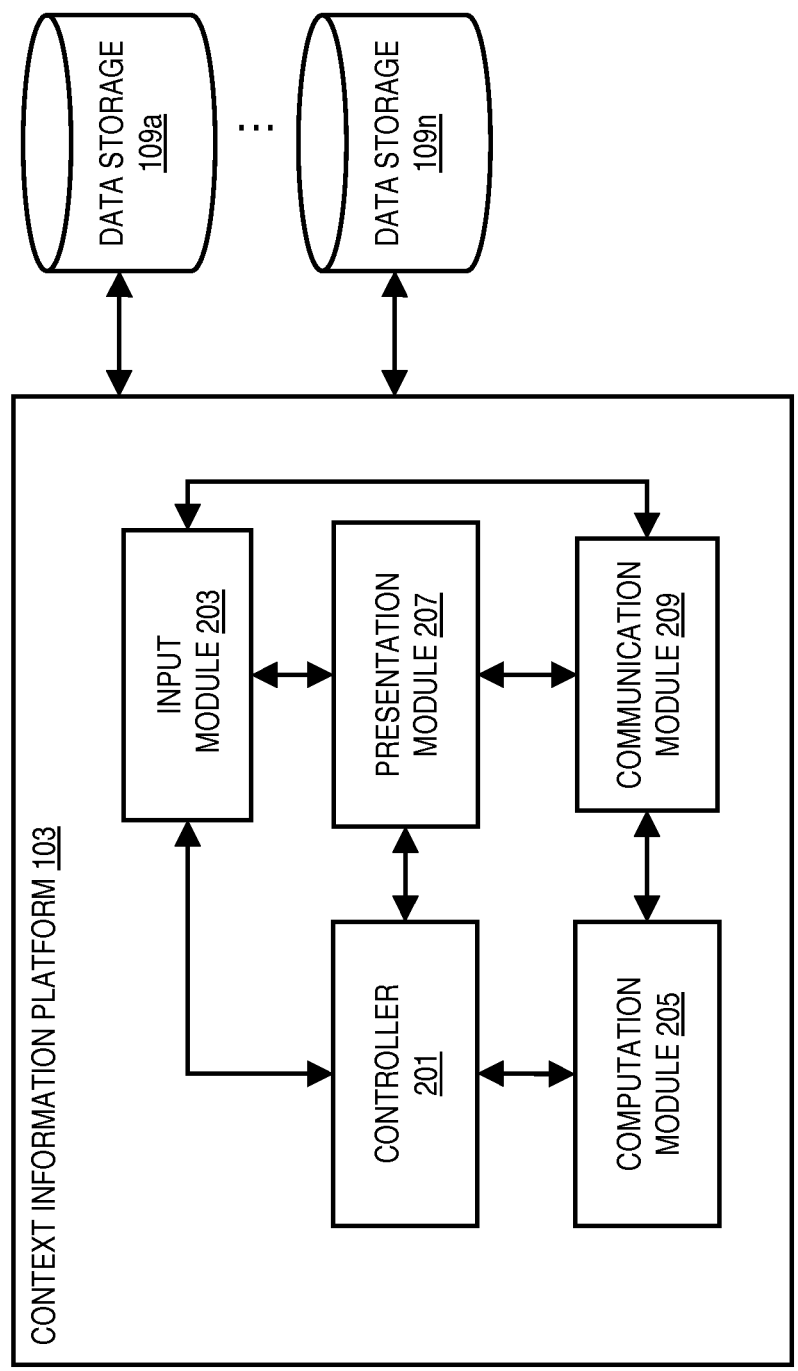
FIG. 2 is a diagram of the components of context pattern platform, according to one embodiment.

FIG. 2 is a diagram of the components of the context information platform 103, according to one embodiment. By way of example, the context information platform 103 includes one or more components for maintaining context information as recorded or monitored by the UE 101 in association with a user defined context. It is contemplated that the functions of these components may be combined in one or more components or performed by other components of equivalent functionality. In this embodiment, the context information platform 103 includes a controller 201, an input module 203, a computation module 205, a presentation module 207 and a communication module 209. The controller 201 oversees tasks performed by the components of the system, including facilitating data exchange and storage of context information through use of various data storage devices 109*a*-109*n* and regulation of its own interactions with other said components 203-207. The input module 203 manages sensory input perceived and provided by the UE 101, including that content information acquired by the sensor modules 111*a*-111*n*. The input into the UE 101 may be in various forms including pressing a physical button on the UE 101, touching a touch screen panel, scrolling through a dial or a pad, etc. The information acquired by the sensor module 111*a*-111*n* may generally conform to an electrical impulse that is ultimately converted into a data type capable of data process by the input module 203. In the instance where a perceived input conforms to a defined context model, this data may be stored as context information.

The computation module 205 performs computation and analysis of context information relative to one or more rules or conditions. Furthermore, the computation module 205 executes one or more algorithms for processing context information to influence device behavior relative to a given context. For example, the computation module 205 may receive acquired context information, parse it to identify specific data elements of interest, then compare said elements against a rules base associated with a particular context. Having met the rules or conditions, at least in part, the computation module 205 may then trigger one or more actions to occur respective to the context in which the rules pertain, including actions associated with the device itself, an application of the device or a service accessible by the device. Triggers may be defined in accord with a threshold or confidence value to affect the sensitivity and responsiveness of the device and/or service to a perceived input.

Additional tasks performed by the computation module 205 may also include data modeling generation and context model training. Specifically, the computation module 205 may enable generation of and maintenance of an initial context model for a given context. This may include establishing a name for a context model relative to a user desired context to be defined (e.g., "Playing Golf"), processing user defined input data types, associating one or more sensors 111 for providing said inputs, correlating one or more output data types, conditional settings, etc. The initial context model can be structured, at least in part, based on an initial "labeled" data set. In other instances, it can be based on "historical" data interactions. The user may interact with and influence the computation module 205 to engage a user defined context of their liking by way of a data exchange or upload process, or alternatively, through usage of the device input mechanisms such as a touch screen, keyboard or the like. Any well known means for generating a context model are useable with respect to the embodiments presented herein.

User defined context model training, or training, pertains to the means in which the context model is further refined by the computation module 205 to model the behavior of the system, object, user, device, interaction or process it is intended to represent. Generally, the training process entails at a minimum, the sampling of additional data corresponding to a defined data type, thereby expanding the quality of the data set and hence the degree of "experience" of the context model. The more data available in connection with the user defined context, the more responsive the device can be when perceiving and responding to differing context information that may occur at the onset or during a given user defined context. Various known training methods may be employed singularly or in combination by the computation module 205. One embodiment contemplates the use of pattern recognition technology or activity recognition to recognize contexts defined by the user.

With regard to activity or pattern recognition, the various sensor signals of the device—e.g., an accelerometer—can be defined based on pattern recognition techniques to provide input to the context model using different classifiers types, object types, defined data types, etc. Techniques implemented in connection with activity or pattern recognition processing may include, but are not limited to, decision tree analysis, support vector machine processing, neural networking, etc. Another embodiment contemplates execution of Gaussian Mixture Modeling and spectral feature extraction computation. Such techniques commonly used in data modeling, including in the area of speech recognition.

Another embodiment contemplates use of semi-supervised learning techniques, wherein the context model can be enhanced by use of the unlabeled context data. "Unlabeled context information," in contrast to "labeled context information" or simply "context information," refers to any sensed data—e.g., sensed by one or more sensors of the device—that does not readily conform to a defined classification or data type of the context model. Traditionally, context training is performed by way of unsupervised processing techniques (e.g., clustering, outlier detection), where no prior knowledge is assumed regarding perceived sensory data; all the data to be ultimately associated with the context model is unlabeled. Alternatively, context training is performed by way of supervised processing techniques (e.g., classification, regression analysis) where all the data is labeled. "Semi-supervised processing techniques," as presented herein, involves the use of labeled and unlabeled data in affecting context generation, recognition and response decisions as well as the design of algorithms that employ the combination (of expected or unexpected data). The computation module 205 executes such algorithms, taking into account sensed context information of an expected/defined (labeled) nature and unexpected/undefined (unlabeled) nature.

Usage of both labeled/recordable context information and unlabeled context information facilitates proper modeling and resolution of sensed context information for more complex contexts. Unlabeled context information detected in connection with or concurrent with labeled context information can be leveraged to redefine or adapt the context model. For example, consistent occurrences of unexpected context information during context engagement can indicate the need for inclusion of such a data type within the model. Also, the unlabeled context information can be processed (e.g., heuristically) for enabling texturing of the labeled content information and data set for the model.

Still further, some context information is beneficial for inclusion and recordation with respect to enhancing the data set while other context information, while observable/monitorable, does not enhance the context model. More complex activities such as "playing golf" for example, consisting of a sequence of fundamental activities and hence contextual data types, may include classifications related to standing, walking, swinging the club, etc. Through use of semi-supervised processing, the computation module can model and progressively train such complex activities in a 2nd pass data processing scheme with rule based methods or Hidden Markov Models, leveraging unlabeled data to further inform and refine the current recorded data set. More basic activities and phenomenon that is sensed while the user is engaged in the context of "playing golf"—i.e., course marking—while observable, need not be recorded unless.

In one embodiment, after performance of context model generation and training by the computation module 205, the controller 201 can interact with a presentation module 207. The presentation module 207 is an executable for regulating and displaying a user interface in connection with the training techniques discussed above. This includes, but is not limited to, presentment of training results to the user based on sensed input data (labeled and unlabeled), definition of context model related data input types and classifications, selection by the user of a given context to invoke, definition or selection of one or more rules bases, definition or selection of one or more trigger actions, enablement by the user to initiate the training and data recordation process, etc. In particular, the ability for the user to selectively initiate the training process in connection with a user defined context enhances the computation module's 205 capacity to distinguish between sensed data types relative to different contextual nuances.

In other embodiments, no presentation of the determined behavior patterns or context training results is displayed directly to the user. For this approach, the user still defines and specifies the context and hence the context model from which to operate. However, the behavior application 107 or platform 103 is configured to make recommendations, suggestions, etc. on the basis of the training results to enact personalized services for the user, acquire content, invoke applications, etc. for the user. The determined behavior patterns may also be used to target service offerings or advertisements that are more likely to be of interest or relevance to the user. As an example, targeted applications or advertisement pertaining to golf may be acquired from the services platform to in response to the "playing golf" user defined context. The more properly trained the context model, the more accurate the provided services can be relative to the context in play.

The UE 101 may also be connected to storage media such as the data storage media 109a-109n such that the context information platform 103 can access or store context information accordingly. If the data storage media 109a-109n are not local to the platform 103, then storage media 109a-109n may be accessed via the communication network 105. The UE 101 may also be connected to the service platform 113 via the communication network 105 to access context information provided by the services 115a-115n. As mentioned before, the functionality described in the preceding paragraphs with respect to the context information platform 103 applies equally to the behavior application 107 operable on a device. Different implementations may be applied to fit different requirements.

Figure 9:
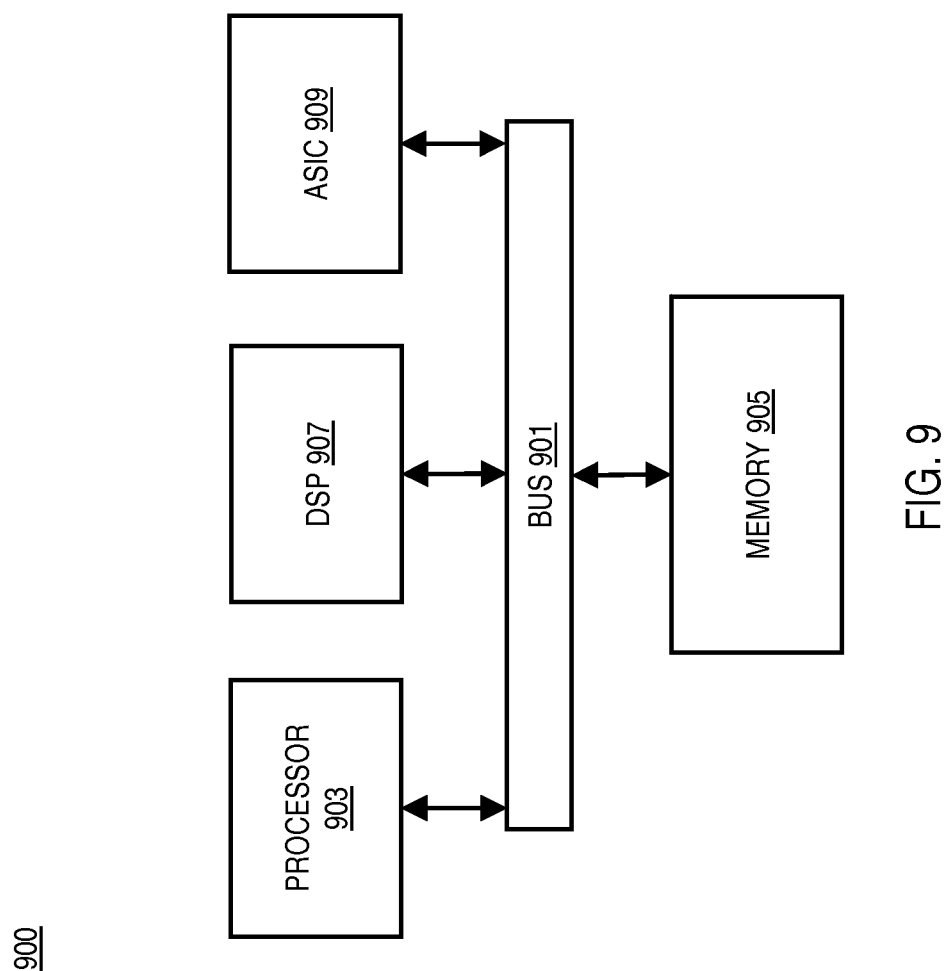
FIG. 9 is a diagram of a chip set that can be used to implement an embodiment of the invention.

Reference is now made with respect to FIG. 3, which depicts is a high-level flowchart of a process for associating user, object or device context information with a user defined context model representative of a real-world context, according to one embodiment. By real-world context, it is meant that the steps presented herein may be engaged appropriately by a device having access to the context information platform 103 or a resident behavior application 107 to affect and influence real-time contextual occurrences. In one embodiment, the context information platform 103 and/or behavior application 107 performs the process 300 and is implemented in, for instance, a chip set including a processor and a memory as shown in FIG. 9. As a first step 301, the context information platform 103 or behavior application 107 receives an input at a device for specifying a context. As noted before, the type of context information received will vary depending on the type of data types associated with a context model invoked by the user relative to their device. In a next step 303, the context information is recorded as it is sensed by one or more sensors of the device. The context information as recorded is associated with the device, a user of the device an object (e.g., with proximity of the device or user) or a combination thereof. As a final step 305, the recorded context information is then associated with the context to which it is defined—i.e., the recorded data is used to refine or update the associated context model.

Figure 4B:
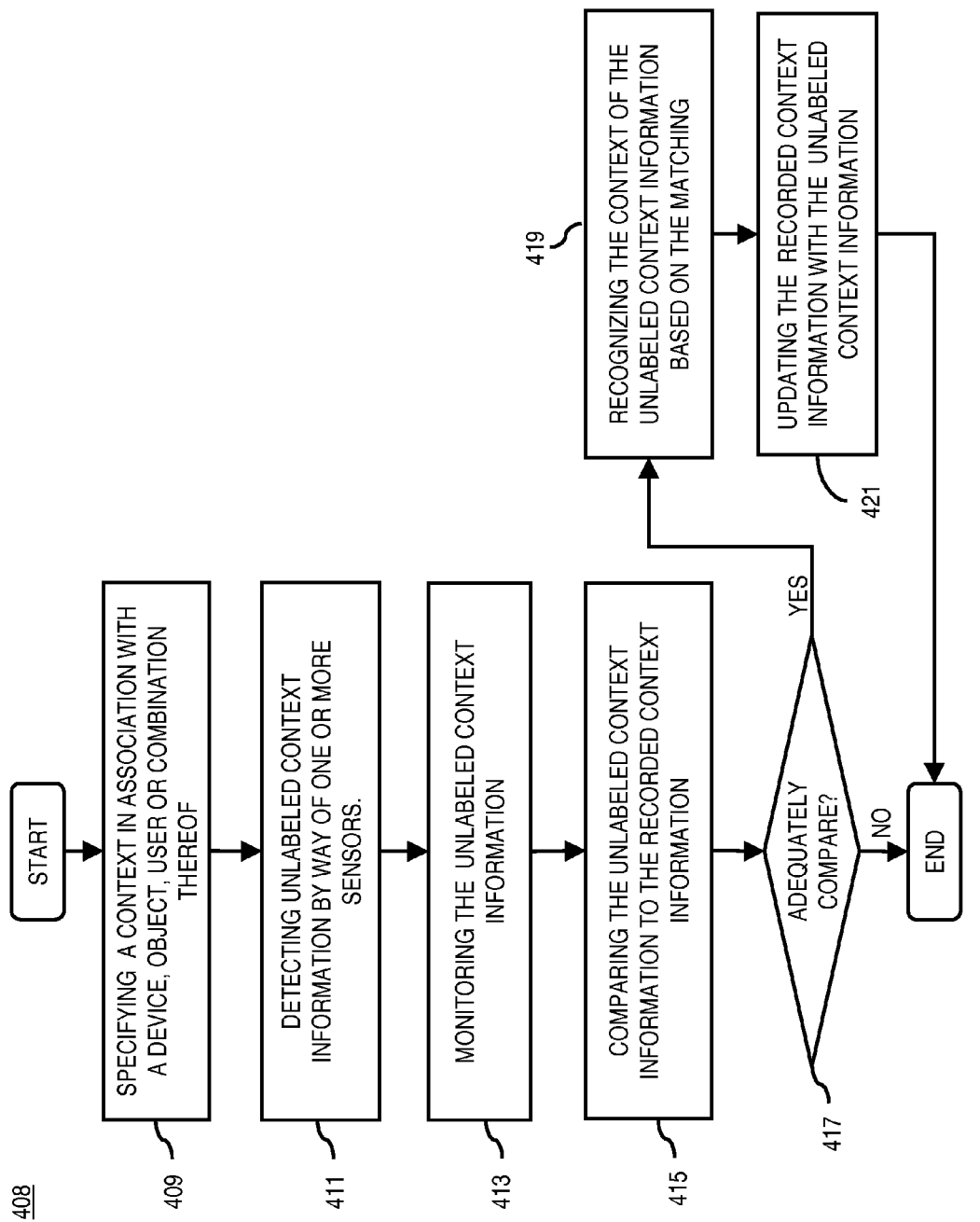
FIG. 4B is a flowchart of a process for associating unlabeled context information with a user defined context model representative of a real-world context, according to one embodiment.

FIGS. 4A and 4B are flowcharts of a process for associating context information and unlabeled context information respectively, with a user defined context model representative of a real-world context, according to one embodiment. With respect to user context training and the steps of FIG. 4A, context information is that which is readily defined, recognizable with respect to a given data type and hence recordable for inclusion with respect to a data set associated with a context model. In contrast, with respect to user context training and the steps of FIG. 4B, unlabeled context information is generally that which is not defined, not recognizable with respect to a given data type and hence must be monitored prior to inclusion with respect to a data set associated with a context model. Both processes, performed in combination or individually with respect to a given user specified context, enable the handling of labeled or unlabeled context information as it is sensed. While presented separately, it should be recognized that these processes are fundamentally invoked concurrently for the purpose of accommodating different contexts.

Figure 7A:
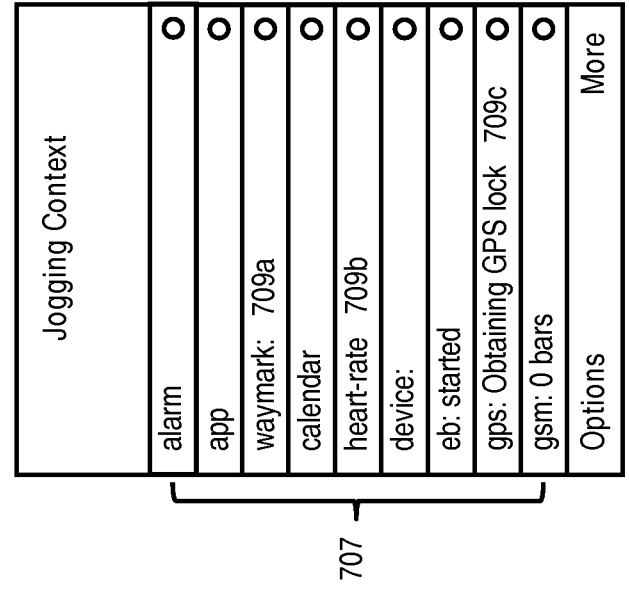

In FIG. 4A, a first step 401 in the context association process 400 involves specifying a context in association with a device, object, user or combination thereof, by a device user. For example, the user may select a specific context to engage or train, such as from a selection menu 701 as shown in FIG. 7A. Having specified the context, the various sensors of the device are then directed to detect context information relative to the specified context. This corresponds to step 403. As the sensors are engaged, context information based on association with a specified context model for the specified context is recorded, and the context information data set maintained by the behavior application 107 and/or context information platform 103 is updated. The preceding steps correspond to steps 405 and 407 respectively, wherein the context model is refined or updated for training purposes.

The process 408 of FIG. 4B also entails a user specified context being selected, as in step 409 (same as 401). Having specified the context, the various sensors of the device detect unlabeled context information, the result being that the information may or may not be related to the specified context. This corresponds to step 411. Consequently, the unlabeled context information is then monitored—i.e., for a period of time or up to a specific data threshold, corresponding to step 413. The monitoring process is performed so as to accumulate/sample enough related unlabeled context information data points to, with analysis as in step 415, ascertain a relative structural pattern or deduce the context model to which it applies. A function of this analysis performed by the behavior application 107 or platform 103, includes at least comparing, at least in part, of the unlabeled context information against the recorded context information (as recorded with respect to FIG. 4A).

When the analysis, at least in part, renders no comparison 417, the process 408 for accounting for and resolving unlabeled context information ends. However, as in steps 417 and 419, when the relative data pattern or structure deduced or extracted through analysis of the unlabeled context information sufficiently comprises, at least in part, the context model associated with the recorded context information (e.g., within a predetermined degree or measure of confidence); the context of the unlabeled context information is therefore recognized. In particular, the context information, though unlabeled initially, is recognized to correspond to the specified user context of step 409 (401). Having associated the context information with a user defined context, a final step 421 entails updating the recorded context information with the unlabeled context information. This final step 421, in effect, corresponds to the refinement or updating of the context model for training purposes, where unlabeled context information becomes part of the recorded (labeled) data set.

FIG. 5 is a flowchart of a process 500 for triggering one or more actions based on the processing of recorded context information as in FIG. 4A or monitored unlabeled context information as in FIG. 4B, for a specified user context according to one embodiment. Having updated the context model accordingly based at least in part on the context information corresponding to the user defined context, the context information is then analyzed against a rules base. This corresponds to steps 501 and 503. As indicated before, the rules base may be user or system defined to include one or more rules/conditions 505 that when satisfied, correspond to the invocation of a specific device action or service 115. In the instance the condition or rule 505 is not met, the context model continues to be updated in accord with step 501, assuming there is additional context information available for refining the model.

In the event that the rule or condition 505 is met however, as in step 507, one or more specified actions, functions, routines or combinations thereof are triggered in accord with the specified rules/conditions. This step 507 entails automatic activation of a service 115 or application resident on the device by either the behavior application 107 or context information platform 103. For example, if the user specified context is "Cooking," the rules base associated with the "Cooking" context model and data set may include downloading recipe content by way of a cooking service application, construction of a shopping list, automatic ordering of groceries, etc. Indeed, the ability to automatically trigger actions, functions, routines or combinations thereof relative to differing real-world contexts enhances the usefulness of a user's device. This also enables a means of targeted, context based interaction to be promoted between the device and the user.

Figure 6A:
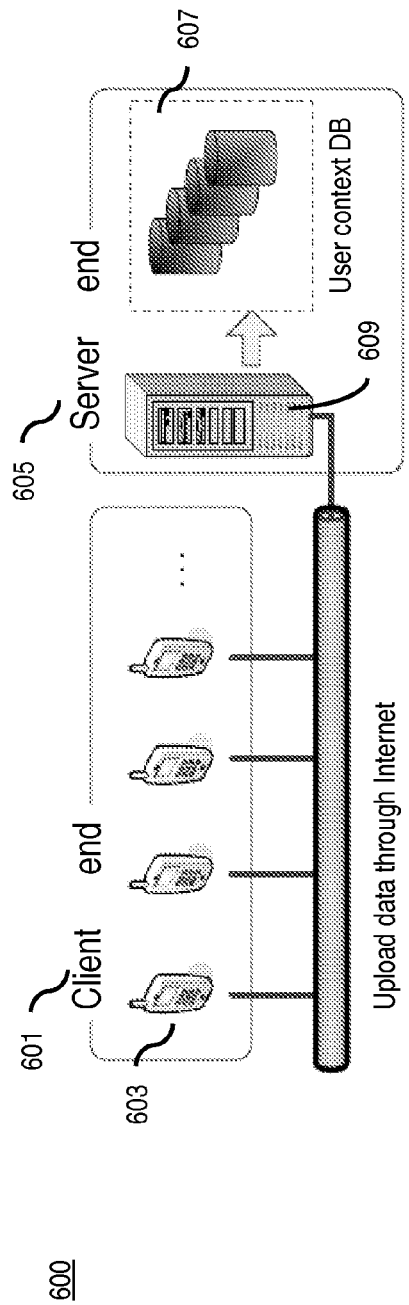
FIGS. 6A and 6B are diagrams of interactions between a client and a server utilized in data mining included in the processes of FIGS. 4A, 4B and 5, according to various embodiments.
Figure 6B:
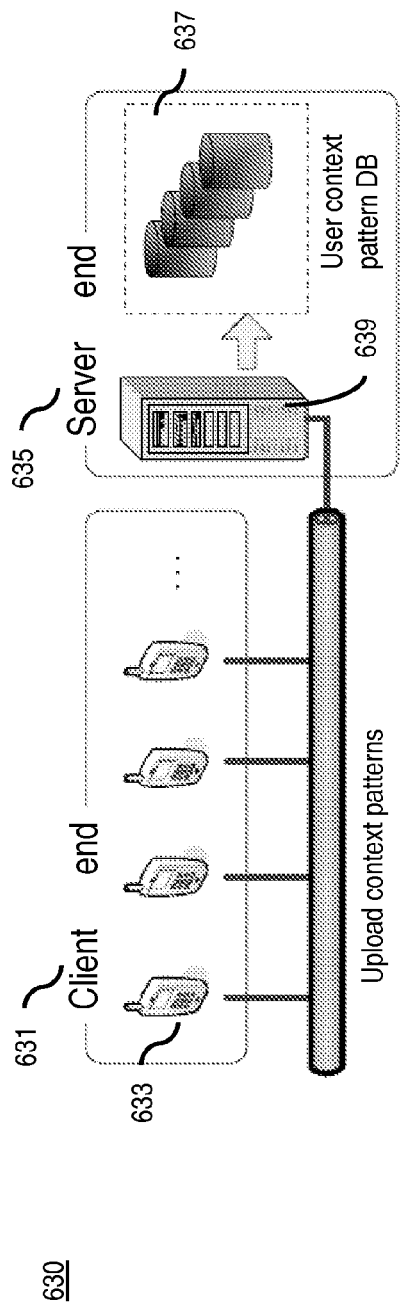

FIGS. 6A and 6B are diagrams of interactions 600 and 630 respectively between a client and a server utilized in data mining included in the processes of FIGS. 4A, 4B and 5, according to various embodiments. FIG. 6A shows that data such as context records retrieved at the client end 601 from mobile devices 603 (e.g., UEs 101a-101n), may be uploaded to the server end 605 through the Internet (e.g., communication network 105). In one embodiment, the server end 605 may include the context information platform 103 and/or the service platform 113. At the server end 605, the uploaded data is stored in the user context database 607. As such, the mobile devices 603 can reduce their computational burdens associated with the data mining to the server 609. It is noted that the server 609 generally has more processing power and related resources (e.g., bandwidth, memory, etc.) than the mobile devices to handle this type of computation.

Alternatively, as shown in FIG. 6B, the data retrieved by the mobile devices 633 at the client end 631 may be stored at storage media (not shown) of the respective mobile devices 633. The mobile devices 633 may then locally perform the computations for determining, for instance, the context patterns from the data. Then, the result of the computation (e.g., the context patterns) may be uploaded to the server end 635 including a server 639 and user context pattern database 637. As such, the data is kept within the respective mobile devices 633 and is not uploaded to other devices or servers without the user's permission. Consequently, a level of privacy protection is established. In addition, for both embodiments in FIGS. 5A and 5B, the user of the mobile device may configure a privacy setting to determine whether any data retrieved from the mobile device can be sent to the server end 635. Further, although not shown, much of the analysis of the behavior pattern according to this invention may be performed within the mobile device 633 even when the mobile device 633 is not connected to the server 639. As long as the mobile device 633 has the data and sufficient processing power to analyze the data, then the server 639 may not be required to perform the analysis.

Figure 7B:
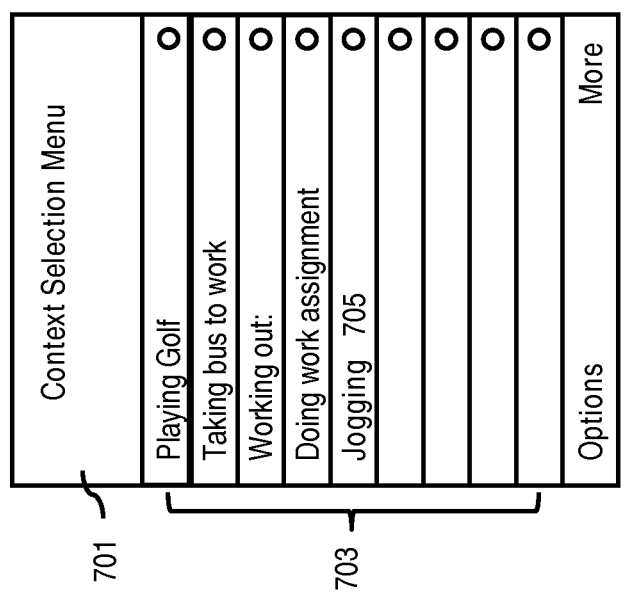

FIGS. 7A-7B are diagrams of user interfaces of a device utilized in the processes of FIGS. 4A, 4B and 5, according to various embodiments. In FIG. 7A, interface 700 reveals a context selection menu 701 in which a device user may select one or more user defined contexts 703 to engage or train. Being user defined, each of the contexts has associated therewith a context model, maintained by the behavior application 107 or context information platform 103 accordingly. For example purposes, it is assumed that the user selected the "Jogging" context 705 from amongst the list of options 703.

Interface 706 reveals one or more characteristics 707 of the context model underlying the "Jogging" context 705, including but not limited to the types of objects and/or data types associated with the context, classifications or combinations thereof. The data is presented by the presentation module 207 to correspond to the data associated with the context model as stored (e.g., as a data file) to data storage 109a-109n. By virtue of the interface, the user may configure, adjust or add characteristics to the context model for the specified user context "Jogging" 705. As such, the data file characterizing the context model is dynamically updated in response to configuration changes authorized by the device user. So, for example, the user may adapt way mark settings 709a or GPS settings 709c in connection with route monitoring needs. Of interest in this particular exemplary context also is the enablement of data type "heart rate" 709c, a data type associated with a signal representing the user's heart rate during a jog. Mediums for generating input for this classification may include a heart rate monitor device configurable to the user's mobile device and the body of the user, plug and play pulse sensors that can be connected to the device and the user or any other objects that relate to the context in question.

FIG. 7C shows a user interface 730 that enables a user to choose data sources or sensors for collection of context information. The sensor menu 731 shows a list of context features or context sources from which context records can be collected. In the example shown in FIG. 7C, Accelerometer, Current Status and Heart Monitor are selected. Thus, the context information retrieved by the mobile device will include data representative of these context features and data types.

FIG. 7D shows a user interface 740 that enables a user to begin the process of recording a specified context via a context training menu 741. The interface also features an action menu 745, in this example presented via the same interface 740, though which the user may specify a particular action to be invoked in response to a trigger condition. The context training menu 741 features a record button 743 for activating the various sensors of FIG. 7C. As such, the user is actively engaged in recording context information in relation to the "Jogging" context 703 or monitoring unlabeled context information accordingly. By way of this feature, the user may actively gather data necessary for training the context model associated with the specified context on demand In addition to training, the user may also select one or more device actions, applications or services to automatically be invoked during the time of recording and monitoring or context information. This is performed through use of an action menu 745, which features a list of available applications, services, functions, routines, etc. relative to the "Jogging" context 703. So, for example, the user may select a "Water Stops" service that downloads content from a service 115 indicating one or more rest stops and water fountains along the user's jogging route or within proximity of their present geographical location. The user may configure the rules base by selecting an "Options" button 605 that provides additional options (e.g., rules configuration, service or application searches, etc.) that can be configured. In addition, the "More" button 607 may be selected to show additional context model characteristics that can be configured by the user.

The processes described herein for associating user, object or device context information with a user defined context model representative of a real-world context may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to associate user, object or device context information with a user defined context model representative of a real-world context as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of associating user, object or device context information with a user defined context model representative of a real-world context.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to associating user, object or device context information with a user defined context model representative of a real-world context. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for associating user, object or device context information with a user defined context model representative of a real-world context. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for associating user, object or device context information with a user defined context model representative of a real-world context, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for associating user, object or device context information with a user defined context model representative of a real-world context to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to associate user, object or device context information with a user defined context model representative of a real-world context as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of services. Chip set or chip 900, or a portion thereof, constitutes a means for performing one or more steps of associating user, object or device context information with a user defined context model representative of a real-world context.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to associating user, object or device context information with a user defined context model representative of a real-world context. The memory 905 also stores the data associated with or generated by the execution of the inventive steps.

Figure 10:
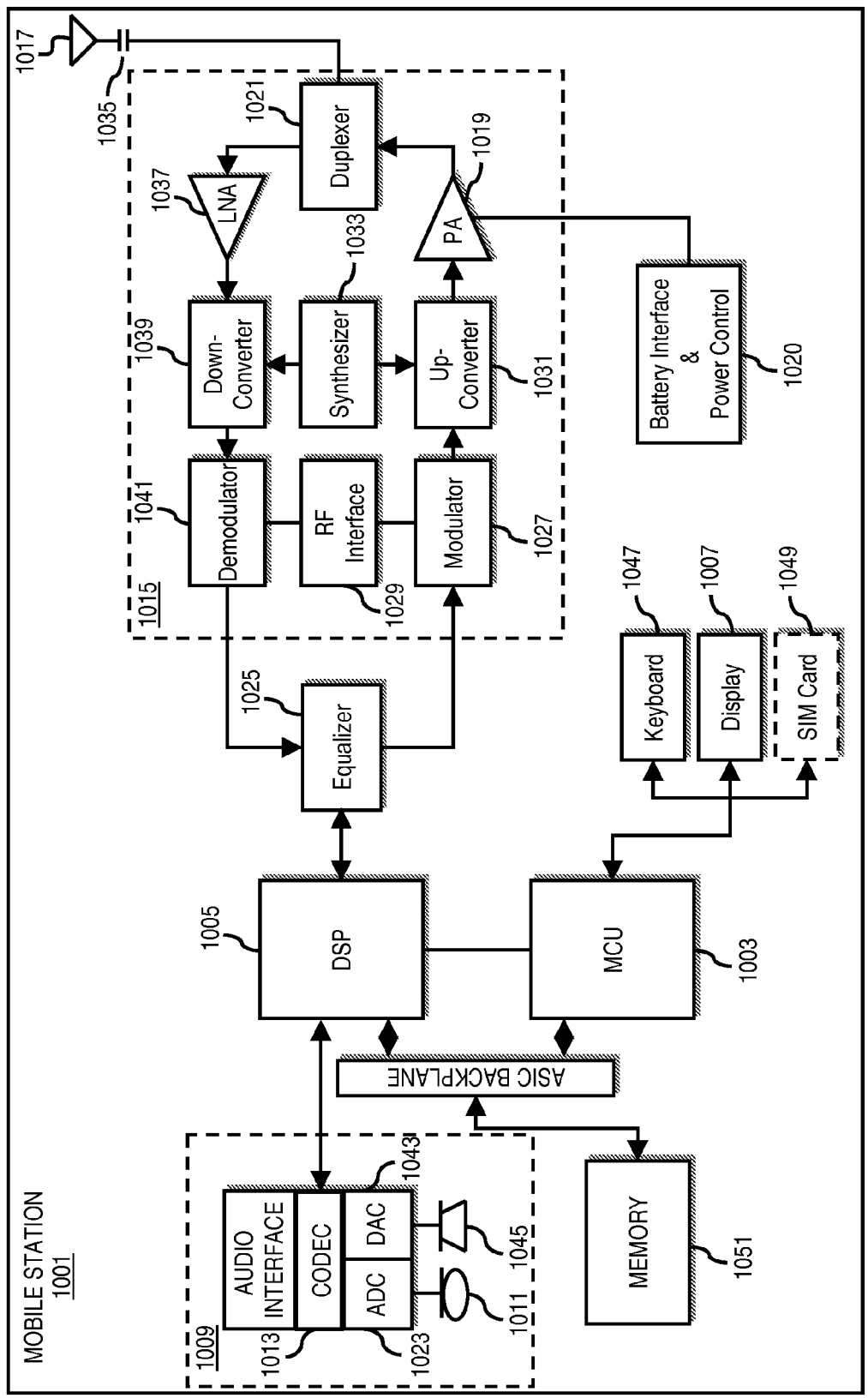
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1000, or a portion thereof, constitutes a means for performing one or more steps of associating user, object or device context information with a user defined context model representative of a real-world context. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of associating user, object or device context information with a user defined context model representative of a real-world context. The display 10 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to associate user, object or device context information with a user defined context model representative of a real-world context. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, by a processor, a user input at a device for specifying a context;
   causing, by one or more sensors, recording of context information associated with the device, the user of the device, or a combination thereof, wherein the recorded context information includes sensory information of the device and user interaction information with one or more services associated with the device;
   updating, by the processor, a context information training database with the recorded context information;
   associating, by the processor, the recorded context information with the context;
   causing, at least in part, monitoring of unlabeled context information associated with the device, the user of the device, or a combination thereof;
   comparing the unlabeled context information against the recorded context information;
   causing, at least in part, recognition of the context associated with the unlabeled context information based, at least in part, on the comparison;
   generating a context model based, at least in part, on the recorded context information;
   generating a behavior model, independent of the context model, based at least in part, on the recorded context information,
      wherein the associating of the recorded context information with the context comprises at least in part associating the context model with the context, and
      wherein the recognition of the context in the unlabeled context information is based, at least in part, on the context model.

2. A method of claim 1,
   wherein the context model is configured to transmit the context information to a platform, and the behavior model is configured not to transmit the context information to the platform.

3. A method of claim 2, further comprising:
   updating the context model based, at least in part, on the recognition of the context.

4. A method of claim 1, further comprising:
   receiving another input for defining one or more rules with respect to the context; and triggering one or more of the rules based, at least in part, on the recognition of the context.

5. A method of claim 4, wherein the one or more rules specify an action, function, routine, or a combination thereof.

6. A method of claim 1, further comprising:
   causing, at least in part, control of one or more applications based, at least in part, on the recognition of the context.

7. A method of claim 1, wherein the context relates to an activity, a location, a time and a date.

8. An apparatus comprising:
   at least one processor; and
   at least one memory including computer program code for one or more programs,
   the at least one memory and the computer program code configured to, with the at least one processor, cause the apparatus to perform at least the following:
   receive, by the processor, a user input at a device for specifying a context;
   cause, by one or more sensors, recording of context information associated with the device, the user of the device, or a combination thereof, wherein the recorded context information includes sensory information of the device and user interaction information with one or more services associated with the device;

update, by the processor, a context information training database with the recorded context information;

associate, by the processor, the recorded context information with the context;

cause, at least in part, monitoring of unlabeled context information associated with the device, the user of the device, or a combination thereof;

compare the unlabeled context information against the recorded context information;

causing, at least in part, recognition of the context associated with the unlabeled context information based, at least in part, on the comparison;

generate a context model based, at least in part, on the recorded context information; and generate a behavior model, independent of the context model, based, at least in part, on the recorded context information, wherein the associating of the recorded context information with the context comprises at least in part associating the context model with the context, and wherein the recognition of the context in the unlabeled context information is based, at least in part, on the context model.

9. An apparatus of claim 8, wherein the context model is configured to transmit the context information to a platform, and the behavior model is configured to not transmit the context information to the platform.

10. An apparatus of claim 9, wherein the apparatus is further caused to: update the context model based, at least in part, on the recognition of the context.

11. An apparatus of claim 8, wherein the apparatus is further caused to:

receive another input for defining one or more rules with respect to the context; and trigger one or more of the rules based, at least in part, on the recognition of the context.

12. An apparatus of claim 11, wherein the one or more rules specify an action, function, routine, or a combination thereof.

13. An apparatus of claim 8, wherein the apparatus is further caused to:

cause, at least in part, control of one or more applications based, at least in part, on the recognition of the context.

14. An apparatus of claim 8, wherein the context relates to an activity, a location, a time and a date.

15. A non-transitory computer-readable storage medium carrying one or more sequences of one or more instructions which, when executed by one or more processors, cause an apparatus to at least perform the following steps:

receiving, by the one or more processors, a user input at a device for specifying a context;

causing, by one or more sensors, recording of context information associated with the device, the user of the device, or a combination thereof, wherein the recorded context information includes sensory information of the device and user interaction information with one or more services associated with the device;

updating, by the one or more processors, a context information training database with the recorded context information;

associating, by the one or more processors, the recorded context information with the context;

causing, at least in part, monitoring of unlabeled context information associated with the device, the user of the device, or a combination thereof;

comparing the unlabeled context information against the recorded context information;

causing, at least in part, recognition of the context associated with the unlabeled context information based, at least in part, on the comparison;

generating a context model based at least in part, on the recorded context information; and generating a behavior model, independent of the context model, based at least in part, on the recorded context information.

16. A non-transitory computer-readable storage medium of claim 15, wherein the context model is configured to transmit the context information to a platform, and the behavior model is configured not to transmit the context information to the platform.

17. A non-transitory computer-readable storage medium of claim 15, wherein the apparatus is caused to further perform:

updating the context model based, at least in part, on the recognition of the context.

18. A non-transitory computer-readable storage medium of claim 15, wherein the apparatus is caused to further perform:

receiving another input for defining one or more rules with respect to the context; and triggering one or more of the rules based, at least in part, on the recognition of the context.

* * * * *